3,043,820
ANAEROBIC CURING SEALANT COMPOSITION HAVING EXTENDED SHELF STABILITY
Robert H. Krieble, West Hartford, Conn.
No Drawing. Filed Oct. 14, 1960, Ser. No. 62,531
14 Claims. (Cl. 260—89.5)

The present invention relates to anaerobic curing compositions utilizing polymerizable compounds having the following general formula:

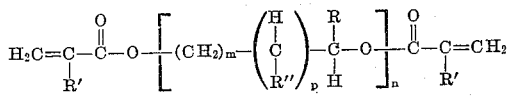

where R is a member selected from the class consisting of hydrogen, —$CH_3$, —$C_2H_5$, —$CH_2OH$, and

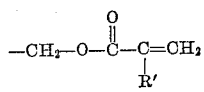

radicals, R' is a member selected from the class consisting of hydrogen, chlorine and methyl and ethyl radicals, R" is a member selected from the class consisting of hydrogen, —OH radical, and

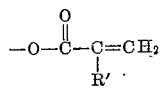

radical; $m$ is an integer equal to at least 1; e.g., from 1 to 8 or higher, for instance, from 1 to 4 inclusive; $n$ is an integer equal to at least 1, for example, 1 to 20 or more; and $p$ is one of the following: 0, 1.

In United States Patent No. 2,895,950, issued July 21, 1959, to Vernon K. Krieble, there is disclosed an anaerobic curing composition utilizing monomers within the foregoing formula which polymerize to the solid state in the presence of certain organic hydroperoxide catalysts rapidly and spontaneously upon the exclusion of air or oxygen from the composition. In addition to anaerobic curing characteristics, these patented compositions provide the additional advantage of long shelf life in the liquid state so long as contact with air is maintained, which feature is particularly useful in the bonding or adhering of adjacent surfaces since the composition can be stored or permitted to stand in contact with air for extended periods of time without polymerization. However, when it is deposited or placed between adjacent surfaces, the resulting exclusion of air produces polymerization of the composition to form a strong bond between the adjacent surfaces.

In the formulation of commercial quantities of sealant compositions in accordance with the Krieble patent by utilization of monomer obtained from commercial sources of supply, it has been found that some batches of the sealant formulation would gel after only short periods of storage although maintained in contact with oxygen. To date, efforts to isolate the cause of such impairment of the air-stable properties of the patented composition have not been successful. However, the effect produced by unknown characteristics in these certain batches of commercial monomer is presumed to be caused by non-isolated or trace amounts of chemical substances or contaminants which tend to promote setting of the composition even in the presence of oxygen. Even large amounts of conventional hydroquinone inhibitor have been unsuccessful in nullifying the effect of these deleterious substances and it has been necessary to make test formulations to determine the suitability of individual shipments of monomer received from commercial sources of supply.

Further, in developmental work leading to the aforementioned Krieble patent, it was found that mixtures of monomer and hydrogen peroxide and organic hydroperoxides other than those defined by the formula set forth in the patent did not produce sealant compositions which had the necessary characteristic of air-stability for extended periods of time. The addition of even large amounts of the conventional hydroquinone inhibitor failed to provide the necessary shelf stability.

It is the aim of the present invention to provide highly desirable sealant compositions which are air-stable at ambient temperatures for extended periods of time and which rapidly set upon the exclusion of air by utilization of commercial monomers which may contain deleterious agents having the effect of impairing air-stability and without impairment of the bond produced by the sealant composition.

It is also an aim of the present invention to provide air-stable sealant compositions utilizing hydrogen peroxide and organic hydroperoxide catalysts which have a tendency to catalyze polymerization even in the presence of oxygen.

Another aim is to prolong the shelf life of anaerobic curing sealant compositions of the type set forth in the Krieble patent which are characterized by shelf stability in the presence of oxygen for even longer periods of time.

In accordance with the present invention, it has been found that the foregoing objects can be attained in anaerobic curing sealant compositions containing essentially substantially unoxygenated monomers corresponding to the formula:

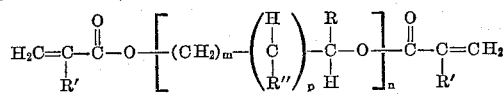

wherein R, R', R", $m$, $n$ and $p$ have the meanings heretofore set forth, and a catalyst which will promote the polymerization of the monomer upon exclusion of air, by the addition of a quinone in minor amounts sufficient to provide the desired degree of shelf stability. It has been found that the addition of minor amounts of quinones will greatly prolong the shelf life of these anaerobic curing compositions during exposure to moderate amounts of air despite the presence of minor amounts of impurities which tend to effect polymerization in the presence of air. It has further been found that by use of the quinone additives, not only the organic hydroperoxide catalysts of the patented Krieble composition may be utilized but also other organic hydroperoxides and hydrogen peroxide. By the use of quinones, the air-stability at ambient temperatures of these compositions, including those which have desirable shelf stability, can be prolonged for indefinite periods of time, thus reducing the problems of storage for the consumer.

The quinones have been found effective in amounts as little as 10 parts per million and have been used in quantities as great as 1,000 parts per million of the basic sealant formulation. A generally effective range for most sealant compositions is 25–500 parts per million and preferably 50–250 parts per million. Generally, the actual amount of quinone necessary will be dependent upon the instability of the basic sealant composition, and it is desirable to prepare a test formulation of small quantity for laboratory evaluation.

Of the various quinones, the benzoquinones have proven highly effective and most desirable for general use since they are readily admixed with the sealant compositions and exhibit excellent inhibition. Naphthoquinones have also proven quite effective and are desirable because they are relatively soluble in alcoholic solution. Phenanthraquinones and anthraquinones are least desirable because of problems of dissolving them and adding them to the mixture. As specific examples of two benzoquinones which have proven particularly effective are 1,4-benzoquinone and 2,5-dihydroxy benzoquinone. Other quinones which may be utilized are 2,5-diphenyl-p-benzoquinone, 1,2-naphthoquinone and 9,10-anthraquinone.

The quinones are most easily incorporated in the sealant composition by dissolving them in a minor amount of ethyl alcohol and then adding the required amount of the alcoholic solution to the sealant formulation. With quinones other than the relatively highly soluble benzoquinones, a saturated alcoholic solution is generally prepared.

The term "unoxygenated" as used herein and in the claims refers to unmodified monomers corresponding to the above formulation as distinguished from the "oxygenated" monomers of United States Patent No. 2,628,178 which are prepared by passing oxygen through the monomer for an extended period of time.

Exemplary of the monomers which may be utilized in the compositions of the present invention are the following: Diethylene glycol dimethacrylate, triethylene glycol dimethacrylate, tetraethylene glycol dimethacrylate, dipropylene glycol dimethacrylate, polyethylene glycol dimethacrylate, di-(pentamethylene glycol) dimethacrylate, tetraethylene glycol diacrylate, tetraethylene glycol di-(chloroacrylate), diglycerol diacrylate, diglycerol tetramethacrylate, tetramethylene dimethacrylate and ethylene dimethacrylate. The foregoing monomers need not be in the pure state but may comprise commercial grade in which inhibitors or stabilizers are included. As in the aforementioned Krieble patent, it is within the scope of the present invention to obtain modified characteristics for the cured composition by the utilization of one or more monomers within the above formula with other unsaturated monomers such as unsaturated hydrocarbons or unsaturated esters.

In the aforementioned Krieble patent there is described and claimed anaerobic curing compositions having the desired air-stability by the use of certain non-polymerizing organic hydroperoxides, which hydroperoxides are characterized by the fact that the atoms directly linked to the carbon atom bearing the hydroperoxide radical are selected from the group consisting of carbon, hydrogen, nitrogen or oxygen, and, in such cases where all of the said directly linked atoms are carbon, not more than two of said carbon atoms comprise the carbon atom of a methyl group. Some of these hydroperoxide catalysts may be produced readily by direct substitution, and others are produced by oxygenation of compounds in the liquid phase, particularly by passing oxygen or an oxygen-containing gas through the compounds, preferably ethers, ketones and hydrocarbons. These catalysts have been found to be latent initiators of polymerization of the aforesaid monomers and their mixture with the monomer is highly sensitive to contact with air so that the catalyst remains inactive or ineffective in the presence of oxygen, but upon exclusion therefrom will initiate polymerization of the monomer. Further details concerning the preparation and specific examples of such hydroperoxide catalysts can be readily obtained from the specification of the aforementioned Krieble patent.

In addition to these organic hydroperoxide catalysts defined by the Krieble patent, it has been found that the present invention enables the utilization of concentrated hydrogen peroxide (90 percent) and the entire class of organic hydroperoxides for the preparation of anaerobic curing compositions having the characteristic of stability in the presence of air at ambient temperatures for extended periods of time. Hydrogen peroxide, however, does not have a sufficient degree of activity for commercially suitable applications and requires acceleration by an additional agent. In the copending application of Vernon K. Krieble, Serial No. 50,594, filed August 19, 1960, the use of accelerators in anaerobic curing compositions selected from the group consisting of imides, formamide and combinations thereof is described and claimed. By use of these accelerators, even the relatively sluggish hydrogen peroxide can be made effective for commercial application.

Although as little as 0.1 percent of catalyst can be employed, it is preferable to utilize about 1 to 10 percent by weight for optimum speed in curing and most desirable storage characteristics. Amounts in excess of 15 percent by weight produce no additional beneficial effect and, in fact, have a tendency to act as a diluent for the cured composition. The amount of catalyst necessary for optimum curing may be decreased by the use of accelerators such as tertiary amines, ascorbic acid, organic phosphites and quaternary ammonium salts, or the accelerators of the above-identified copending application of Vernon K. Krieble. Generally these accelerators are utilized in percentages varying from about 0.05–5.0 percent by weight of the composition, and preferably about 0.5–2.5 percent by weight.

To determine the long-term stability of the sealant compositions, a simple but effective test has been developed. The sealant is placed in polyethylene bottles which are then placed in controlled temperature ovens maintained at 82° C. (±1°). At the end of predetermined intervals, generally ten minutes or less, a glass rod is dropped into the sealant. If the rod strikes the bottom of the bottle, the composition has not gelled. When the viscosity of the gelling sealant prevents the rod from striking the bottom, the time is noted. It has been found that a sealant still free from gelling for thirty minutes or more during this accelerated heat aging test will be free from gelling at ambient temperatures in the presence of oxygen for at least one year, which is the commercially desirable minimum shelf life.

To test the activity of the sealant composition of the present invention, simple tests are available. For one test, several drops of the sealant mixture are placed between two elongated plates of glass or metal or of glass and metal, preferably at right angles to each other. When it is possible to move the two plates as a unit by manipulating one of the plates, it is evident that polymerization has taken place. In general, such a degree of polymerization within several hours is satisfactory for most purposes, although longer periods are permissible for some applications where bond strength is not required immediately. A more quantitative test is provided by subjecting the plates to shear stress to determine the shear strength of the bond.

In another test, the strength of the bond between threaded members is determined by placing several drops of the sealant in the mating threads of a nut and bolt, tightening the nut to a predetermined torque, and allowing the sealant to set and cure, generally at room temperature. In some instances, the break-loose torque is noted, but more conventionally the prevailing torque is the measure of bond strength. To obtain the prevailing torque for the bond, the torque required to turn the bolt or screw at several, usually four or five, points after the break-loose torque and up to one full turn are averaged. For example, the torques required at ¼, ½, ¾ and 1 turn are taken and averaged. Commercially, a bolt adhesive developing a prevailing torque of one foot pound on ⅜ inch full nut is considered satisfactory.

The composition of the present invention may be mixed at ambient temperatures for periods of months and even years prior to actual use and stored for such periods at room temperature without any evidence of gelling. It is only necessary that there be present a moderate amount of air or oxygen which is provided conveniently by a small volume of air in a properly shaped container, preferably of polyethylene or a similar material which is air permeable. However, upon exclusion from air by placement between adjacent surfaces, the sealant composition will rapidly polymerize to form a strong bond, which polymerization can be further accelerated by use of elevated temperatures, although such elevated temperatures are not necessary in general practice.

Because of the efficacy of these sealant compositions, only small amounts are necessary to bond mating surfaces, and a few drops of the composition will suffice for bonding the cooperating threads of the nut and bolt. The surfaces to which the sealant is to be applied should be free from grease or contamination prior to application. When used on softer metals such as aluminum and copper, or when the engagement ratio between the members to be joined is high, it may be desirable to reduce the shear strength produced by the sealant mixture through the incorporation of compatible diluents.

As pointed out in the aforementioned Krieble patent, the compositions are non-volatile and may be varied in viscosity by means of the particular monomer selected and by use of thickening agents. It is generally desirable to have a thin liquid of low viscosity having good capillary action for purposes of bonding closely fitting surfaces or for bonding previously assembled parts by penetration of the sealant composition between the mating surfaces. In bonding loose-fitting surfaces or for filling large spaces or voids, high viscosity sealant compositions are preferable.

The sealant compositions may be applied by penetration through capillary action or by precoating the parts in tumbling, spraying or dipping operations. Most metals will catalyze the cure of the sealant compositions; however, certain metals such as cadmium and zinc do not always have the desired catalytic effect, and it is preferred to treat one or both of the mating surfaces with a heavy metal compound which is soluble in the sealant mixture, such as ferric chloride, cobalt, manganese, lead, copper and iron soaps.

To illustrate the efficacy of the present invention, various formulations were prepared. In some instances, the basic sealant mixture possessed a desirable degree of shelf stability for commercial purposes, but the quinones were added to illustrate their effectiveness in prolonging the shelf life of even a desirable mixture. In other instances, the addition of various quinones converted a composition from a monomer batch having undesirably low shelf stability to one which was highly suitable for commercial purposes. In still other instances, other catalysts were utilized to provide shelf-stable compositions.

EXAMPLE 1

A formulation was prepared utilizing commercial tetraethylene glycol dimethacrylate, 7 percent by weight cumene hydroperoxide and 2 percent by weight triethylamine. When subjected to heat aging at 82° C., the formulation gelled in 10 minutes indicating an undesirably low shelf stability probably occasioned by the presence of impurities in the commercial monomer product.

To separate portions of this formulation were added 50 parts per million and 200 parts per million, respectively, of 1,4 benzoquinone. Upon heat aging, the formulation containing 50 parts per million benzoquinone gelled after 20 minutes at 82° C. and that containing 200 parts per million did not gel until after 43 minutes at 82° C.

As is evident from the foregoing, the benzoquinone rendered an unstable monomer formulation highly stable on the accelerated heat aging test indicating its stability at ambient temperatures for periods of indefinite duration and well in excess of 1 year.

A few drops of the formulation having 200 parts per million benzoquinone were placed on the threads of ⅜ inch nuts and bolts which were then tightened and allowed to stand at room temperature for 3 hours. The prevailing torque was found to be 5 foot pounds after this period or well in excess of commercial specifications for the basic formulation, thus indicating that even this large quantity of benzoquinone did not interfere unduly with the anaerobic curing properties of the composition.

EXAMPLE 2

To a batch of commercial tetraethylene glycol dimethyacrylate was added 7 percent by weight of tertiary butyl hydroperoxide. Upon heat aging at 82° C., this formulation gelled after 20 minutes, indicating an undesirably low shelf stability at ambient temperatures.

To a second batch of the same monomer were added 7 percent by weight tertiary butyl hydroperoxide and 100 parts per million benzoquinone. To a third batch of the same monomer were added 7 percent by weight tertiary butyl hydroperoxide and 0.2 cc. per 100 cc. monomer of a saturated solution and 1,2-napthoquinone in alcohol. Upon heat aging at 82° C., these latter two formulations did not gel until after 30 minutes at room temperature, indicating a shelf stability at ambient temperatures in excess of one year. Separate formulations containing 200 parts per million benzoquinone and 0.6 cc. of 1,2-napthoquinone per 100 cc. monomer, respectively, did not gel until after three hours at 82° C.

A few drops of the formulation containing only tertiary butyl hydroperoxide placed on the threads of ⅜ inch nuts and bolts produced a prevailing torque of 7 foot pounds at the end of 15 hours. The formulation containing 100 parts per million benzoquinone produced a prevailing torque of 11 foot pounds in the same period of time and that containing the 0.2 cc. 1,2-napthoquinone produced a prevailing torque of 6 foot pounds at the end of the same period of time indicating that the quinone additives had not interfered with the sealant properties of the monomer.

EXAMPLE 3

To illustrate the effectiveness of the quinones of the present invention as contrasted with the ineffectiveness of the conventional hydroquinone inhibitor, a commercial formulation was prepared utilizing tetraethylene glycol dimethacrylate, 7 percent by weight cumene hydroperoxide and 2 percent by weight triethylamine. When subjected to heat aging at 82° C., this formulation gelled at the end of 17 minutes, indicating an undesirably low shelf stability. This formulation produced prevailing torque of 7 foot pounds at the end of six hours when applied to the threads of ⅜ inch nuts and bolts.

To separate portions of this composition were added, respectively, 50 parts per million, 100 parts per million and 200 parts per million hydroquinone. In each instance, the hydroquinone formulation gelled at the end of about 15 minutes heat aging at 82° C. and the prevailing torques at the end of six hours developed by the several formulations on ⅜ inch nuts and bolts were respectively 5 foot pounds, 7 foot pounds and 5 foot pounds.

To separate portions of the sealant formulation were added 2,5-diphenyl-p-benzoquinone utilizing respectively 0.2 cc., 0.4 cc. and 0.6 cc. of a saturated alcohol solution per 100 cc. of sealant formulation. When subjected to heat aging, each of these formulations did not gel for 40 minutes at 82° C., indicating a very highly desirable shelf stability. When placed on the threads of ⅜ inch nuts and bolts which were allowed to stand for six hours at room temperature, the prevailing torques developed by these several formulations were respectively 7⅔, 7½ and 5 foot pounds, indicating no significant effect upon the sealant properties of the composition.

A separate batch of sealant composition was prepared as initially indicated and found to gel at the end of 15 minutes at 82° C. and to develop a prevailing torque of 10½ foot pounds at the end of six hours. To a separate portion of this composition was added 1,4-benzoquinone in an amount of 50 parts per million. Upon heat aging at 82° C., this formulation did not gel until after 48 minutes, indicating a very desirable shelf stability, and the prevailing torque developed by this composition at the end of 6½ hours was 10½ foot pounds, indicating no loss in the sealant properties.

EXAMPLE 4

To a batch of commercial tetraethylene glycol dimethacrylate were added 10 percent by weight p-menthane hydroperoxide and 2 percent by weight triethylamine. Upon heat aging at 82° C., the formulation gelled at the end of 15 minutes, indicating an undesirably low shelf stability. When placed on the threads of ⅜ inch nuts and bolts and allowed to cure at room temperature for 15 hours, the prevailing torque was found to be 12½ foot pounds.

To a second batch of the tetraethylene glycol dimethacrylate monomer were added 10 percent by weight p-menthane hydroperoxide, 2 percent by weight triethylamine and 100 parts per million 1,4-benzoquinone. Upon heat aging at 82° C., this formulation did not gel until after 130 minutes, indicating its stability at ambient temperatures for indefinitely long periods of time. A few drops of this formulation placed on the threads of ⅜ inch nuts and bolts which were allowed to stand at room temperature for 15 hours developed a prevailing torque of 12 foot pounds, indicating that the benzoquinone had not interfered with the sealant properties.

EXAMPLE 5

To illustrate the efficacy of the various quinones, a series of formulations were made utilizing commercial tetraethylene glycol dimetharcylate, 7 percent by weight cumene hydroperoxide and 2 percent trimethylamine. Quinone stabilizers were added to this composition in the amounts indicated in the following table, after which the several compositions were subjected to a heat aging test at 82° C. and the time of gelling noted.

*Table*

| Quinone | Amount | Time of Gelling, Minutes |
|---|---|---|
| None | | 30 |
| 1,4-Benzoquinone | 100 p.p.m | 50 |
| Naphthoquinone | 0.10 cc. Saturated Alcohol Soln. | 60 |
| Anthraquinone | 0.1 cc. Saturated Alcohol Soln. per 10 cc. monomer. | 40 |
| 2,5-Diphenyl-p-benzo-quinone | do | 70 |

As is evident from the above table, the several quinones have varying effects in prolongation of the shelf stability of the sealant compositions.

EXAMPLE 6

To a batch of commercial ethylene glycol diacrylate monomer were added 7 percent by weight cumene hydroperoxide and 2 percent by weight triethylamine. This mixture was found to be stable for 35 minutes at 82° C., indicating a desirable shelf stability at ambient temperatures.

To illustrate the effectiveness of the present invention, a similar formulation was prepared from the same batch of monomer containing additionally 100 parts 1,4 benzoquinone. This latter formulation did not gel until after 48 minutes at 82° C., indicating the highly desirable prolongation of shelf stability provided by the benzoquinone.

A few drops of the two sealant formulations were placed on the threads of ⅜ inch nuts and bolts which were allowed to stand at room temperature for three hours. The first formulation developed a prevailing torque of 16 foot pounds, and the second formulation containing benzoquinone developed a prevailing torque of 15 foot pounds, indicating that the benzoquinone had not affected the sealant properties of the composition, since the minor difference was well within the limits of experimental error.

EXAMPLE 7

To a commercial batch of tetramethylene dimethacrylate were added 10 percent by weight of cumene hydroperoxide and 4 percent by weight triethylamine. This formulation was stable for a period of 45 minutes at 82° C., indicating a very desirable shelf stability. A few drops of the formulation placed on the threads of ⅜ inch nuts and bolts produced a prevailing torque of 18 foot pounds after 24 hours at room temperature.

To a second batch of the same monomer were added 10 percent by weight cumene hydroperoxide, 4 percent by weight triethylamine and 100 parts per million 1,4 benzoquinone. This formulation was stable for 70 minutes at 82° C., indicating the increase in stability enabled by the use of quinones. This formulation when placed upon threads of ⅜ inch nuts and bolts produced a prevailing torque of 15 foot pounds at the end of 24 hours at room temperature.

EXAMPLE 8

To a bath of commercial tetraethylene glycol dimethacrylate were added 7 percent by weight cumene hydroperoxide and 2 percent by weight triethylamine. The above formulation was subjected to a heat aging test at 82° C. and gelled at the end of 19 minutes, indicating an undesirably low shelf stability.

To a second batch of the same monomer were added cumene hydroperoxide and triethylamine in the same amounts together with 100 parts per million 1,4 benzoquinone. Upon heat aging at 82° C., this formulation did not gel until after 45 minutes, indicating its shelf stability at ambient temperatures for periods in excess of one year and of indefinite duration.

A few drops of the first formulation were placed upon the threads of ⅜ inch nuts and bolts and allowed to stand at room temperature for three hours. This sealant formulation was found to develop a prevailing torque of 11 foot pounds. A few drops of the second formulation containing the benzoquinone produced a prevailing torque of 14 foot pounds under the same conditions, indicating that the benzoquinone had not affected the sealant properties of the composition.

EXAMPLE 9

A sealant formulation was prepared by adding to commercial tetraethylene glycol dimethacrylate 2 percent by weight of benzoic sulfimide and 3 percent by weight of concentrated hydrogen peroxide (90 percent). When stored at room temperature in a polyethylene bottle in the presence of air, the composition was found to have gelled at the end of 24 hours. When placed upon the threads of ⅜ inch nuts and bolts and allowed to stand for 4 hours, the prevailing torque was found to be 8 foot pounds.

To a separate batch of the same formulation was also added 100 parts per million 1,4-benzoquinone. This composition has been stored at room temperature in polyethylene bottles for over one year without evidence of gelling. When placed upon the threads of ⅜ inch nuts and bolts and allowed to stand for four hours, the prevailing torque developed by this composition was found to be 7 foot pounds.

EXAMPLE 10

To illustrate the effect of increasing the amount of quinone stabilizer, a formulation was prepared from tetraethylene glycol dimethacrylate by adding 7 percent by weight cumene hydroperoxide and 2 percent by weight triethylamine. Upon heat aging at 82° C., this formulation gelled at the end of 35 minutes. When placed upon the threads of ⅜ inch nuts and bolts, the formulation developed a prevailing torque of 13 foot pounds at the end of 3 hours at room temperature.

Although the above formulation had a satisfactory shelf life, varying amounts of 1,4-benzoquinone were added to separate portions of the formulation to illustrate the effect of the additive. Three separate formulations were prepared utilizing respectively 50 parts per million, 100 parts per million and 200 parts per million of the benzoquinone. Upon heat aging at 82° C., the formulation containing 50 parts per million benzoquinone did not gel until after 45 minutes, and the other two formulations did not gel until after 90 minutes. When a few drops of each of these several formulations were placed on the threads of ⅜ inch nuts and bolts, the formulation containing 50 parts per million produced a prevailing torque of 10 foot pounds at the end of 3 hours; that containing 100 parts per million produced a prevailing torque of 12¾ foot pounds; and that containing 200 parts per million produced a prevailing torque of 8 foot pounds. As is apparent from the above data, the addition of quinone had a desirable effect of increasing the shelf stability of already desirable compositions and even large amounts of the quinone additive did not have any significant effect upon the sealant properties of the composition.

EXAMPLE 11

A sealant formulation was prepared from commercial tetraethylene glycol dimethacrylate by adding thereto 7 percent by weight cumene hydroperoxide and 2 percent by weight triethylamine. Upon heat aging at 82° C., this composition was found to gel after only 19 minutes, indicating an undesirably low shelf stability. When placed upon the threads of ⅜ inch nuts and bolts and allowed to cure for 3 hours, the prevailing torque developed by the composition was 12¾ foot pounds.

To separate portions of this sealant formulation were added respectively 0.2 cc., 0.4 cc. of a saturated alcohol solution of 2,5-dihydroxy benzoquinone per 100 cc. of sealant formulation. When subjected to heat aging at 82° C., each of these formulations did not gel until after 30 minutes, indicating a desirable shelf stability. When placed upon the threads of ⅜ inch nuts and bolts, the formulations containing 0.2 cc. and 0.4 cc., respectively, produced a prevailing torque of 8⅓ and 13 foot pounds at the end of 3 hours at room temperature, indicating no substantial effect upon the sealant properties of the present composition.

To additional separate portions of the basic sealant formulation were added respectively 0.2 cc., 0.4 cc. and 0.6 cc. of a saturated alcohol solution of 1,2-naphthoquinone per 100 cc. of sealant composition. When subjected to heat aging at 82° C., these mixtures did not gel until after periods of 65 minutes, 60 minutes and 65 minutes, respectively, indicating a highly desirable shelf stability.

As will be readily apparent from the foregoing detailed specification and specific examples, the present invention enables the use of commercial monomers having unascertained characteristics tending to promote polymerization even in the presence of oxygen and further enables the use of additional catalysts which by themselves have a tendency to produce polymerization even in the presence of oxygen. Additionally, the shelf life of already desirable formulations can be further extended in accordance with the present invention.

I claim:
1. A sealant composition having extended shelf life in the presence of oxygen and rapidly polymerizable upon the exclusion of oxygen comprising a mixture of an unoxygenated monomer corresponding to the general formula:

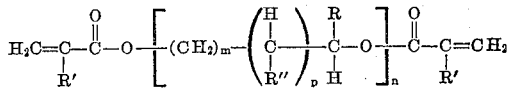

wherein R is a member selected from the class consisting of hydrogen, —CH₃, —C₂H₅, —CH₂OH,

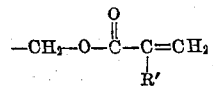

R' is a member selected from the class consisting of hydrogen, chlorine, —CH₃ and —C₂H₅, R" is a member selected from the class consisting of hydrogen, and —OH and

$m$ is an integer equal to at least 1, $n$ is an integer equal to at least 1, and $p$ is one of the following: 0, 1; 0.1–15.0 percent by weight of a catalyst selected from the group consisting of hydrogen peroxide and organic hydroperoxides sufficient to polymerize said monomer at room temperature upon the exclusion of oxygen; and a quinone inhibitor in an amount equal to 10–1000 parts per million and sufficient to prevent gelling of the composition in the presence of oxygen for extended periods of time at room temperature.

2. The sealant composition in accordance with claim 1 wherein said catalyst is an organic hydroperoxide.
3. The sealant composition in accordance with claim 1 wherein said catalyst is hydrogen peroxide.
4. The sealant composition in accordance with claim 1 wherein said inhibitor is a benzoquinone.
5. The sealant composition in accordance with claim 1 wherein said inhibitor is a naphthoquinone.
6. The sealant composition in accordance with claim 1 wherein said inhibitor is a phenanthraquinone.
7. The sealant composition in accordance with claim 1 wherein said inhibitor is an anthraquinone.
8. The sealant composition in accordance with claim 1 wherein the monomer comprises tetraethylene glycol dimethacrylate.
9. The sealant composition in accordance with claim 1 wherein the catalyst comprises cumene hydroperoxide.
10. The sealant composition in accordance with claim 1 wherein the catalyst comprises methyl ethyl ketone hydroperoxide.
11. A sealant composition having extended shelf life when exposed to oxygen but polymerizable rapidly upon the exclusion of oxygen comprising a mixture of an unoxygenated monomer corresponding to the general formula:

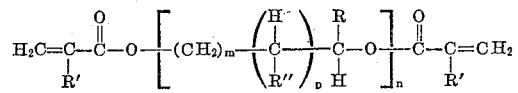

wherein R is a member selected from the class consisting of hydrogen, —CH₃, —C₂H₅, —CH₂OH

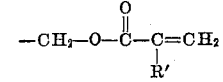

R' is a member selected from the class consisting of hydrogen, chlorine, —CH₃ and —C₂H₅, R" is a member selected from the class consisting of hydrogen, —OH and

$m$ is an integer equal to at least 1, $n$ is an integer equal to at least 1, and $p$ is one of the following: 0.1–15.0 percent by weight, sufficient to polymerize said monomer at room temperature upon the exclusion of oxygen, of an organic hydroperoxide catalyst; and an inhibitor selected from the group consisting of benzoquinones, naphthoquinones, phenanthraquinones, and anthraquinones in an amount from 10–1000 parts per million and sufficient to prevent gelling of said composiiton in the presence of oxygen for extended periods of time at room temperature.

12. The sealant composition in accordance with claim 11 wherein the inhibitor comprises a benzoquinone.

13. A sealant composition having extended shelf life when exposed to oxygen but polymerizable rapidly upon the exclusion of oxygen comprising a mixture of an unoxygenated monomer corresponding to the general formula:

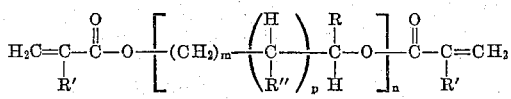

wherein R is a member selected from the class consisting of hydrogen, —$CH_3$, —$C_2H_5$, —$CH_2OH$,

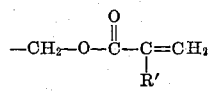

R' is a member selected from the class consisting of hydrogen, chlorine, —$CH_3$ and —$C_2H_5$, R'' is a member selected from the class consisting of hydrogen, —OH and

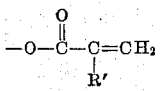

$m$ is an integer equal to at least 1, $n$ is an integer equal to at least 1, and $p$ is one of the following: 0, 1; 0.1–15.0 percent by weight, sufficient to polymerize said monomer at room temperature upon the exclusion of oxygen, of concentrated hydrogen peroxide, and a minor amount of an accelerator for said hydrogen peroxide catalyst; and an inhibitor selected from the group consisting of benzoquinones, naphthoquinones, phenanthraquinones, and anthraquinones in an amount from 10–1000 parts per million and sufficient to prevent gelling of said composition in the presence of oxygen for extended periods of time at room temperature.

14. The sealant composition in accordance with claim 13 wherein the inhibitor comprises a benzoquinone.

References Cited in the file of this patent

UNITED STATES PATENTS

| | | |
|---|---|---|
| 2,273,891 | Pollack et al. | Feb. 24, 1942 |
| 2,308,236 | Pollack et al. | Jan. 12, 1943 |
| 2,628,178 | Burnett et al. | Feb. 10, 1953 |
| 2,895,950 | Krieble | July 21, 1959 |

OTHER REFERENCES

Schildknecht: Polymer Processes, Interscience (1956), pages 6, 28–30, 37 and 43.

Schmitz et al.: Science, vol. 113, pages 718–719 (1951).